Jan. 10, 1967  N. S. MASCHNER ET AL  3,297,518
COMPOSITE LAMINATE FILM AND METHOD OF MAKING SAME
Filed July 19, 1963  2 Sheets-Sheet 1

INVENTORS.
Norman S. Maschner
BY Donald W. Seidler

AGENT

3,297,518
COMPOSITE LAMINATE FILM AND METHOD OF MAKING SAME

Norman S. Maschner, Fairview Park, and Donald W. Seidler, Rocky River, Ohio, assignors to The Dow Chemical Company, Midland, Mich., a corporation of Delaware
Filed July 19, 1963, Ser. No. 296,339
7 Claims. (Cl. 161—184)

This invention relates to improvements in the art of providing protective film or foil and analogous sheet-like structures for wrapping, packaging and related purposes. More particularly, this invention pertains to new and useful transparent, heat-sealable, essentially moisture- and grease-proof composite laminated film structures comprised of a layer of polyethylene or the like non-aromatic hydrocarbon (i.e. aliphatic) olefin polymer that is effectively laminated or bonded to and, as it were, supported upon, a pre-formed substrate layer or sheet of saran coated nylon, and, to a method of making the same.

Films and other shaped articles of polyethylene, polypropylene and the like non-aromatic hydrocarbon olefin polymers have many attractive characteristics including, in general: pronounced chemical inertness; good physical properties (especially significant strength, toughness and resistance to tearing); excellent behavior, without marked tendency to embrittlement at low temperature; and, in particular, unusual capability for being heat sealed in order to provide strong, permanent joints upon being thermally welded or fused together when in contact under the influence of heat at elevated temperatures and, if desired, pressure along the seam or other welded area being joined.

The latter feature, as is well known and widely appreciated by those skilled in the art, is of great desirability and decided advantage for fabrication of film and analogous sheet-like structures into many useful articles and products (such as bags, pouches, etc.) and in the general utilization thereof for many wrapping and packaging applications. Incidentally, such feature and characteristic is not readily obtainable in film and analogous sheet-like articles of saran-coated nylon. Such materials have thermal characteristics that do not result in adequate seal strength upon being attempted to be heat sealed or thermally welded together.

On the other hand, film structures and the like shaped articles of saran coated nylon, besides having generally satisfactory properties and characteristics as film materials, have (due to their integral saran coating) an unusual ability to provide particularly effective barriers against the transmission or permeation of gases and vapors in addition to water vapor. Furthermore, such saran coated films of nylon are usually not as prone to becoming surface scuffed or marred in use as are the typical polymers of ethylene, propylene and the like.

Despite the obvious beneficial utility as a flexible, vapor-proof film or foil article or analogous sheet- like structure, which would be easily susceptible to being heat sealable, that could be provided by composite laminate structures comprised of polyethylene and the like non-aromatic hydrocarbon film bonded or laminated to a sheet or the like of saran coated nylon film, much difficulty has been experienced in their derivation. This is because of the inefficient bonding and poor adherence that is experienced, first of all, when coating saran to sheets or films of nylon, and secondly, due to equally inefficient bonding and poor adherence that is experienced when laminated sheets or films of saran coated nylon are attempted to be formed into composite structures with polyethylene and the like film and other articles.

It is among the principal objects of this invention to provide an efficient and effective method for preparing transparent, heat-sealable, essentially moisture- and grease-proof composite laminated film structures comprised of a layer of a non-aromatic hydrocarbon olefin polymer including, in particular, polyethylene, polypropylene and the like compositions, which is securely laminated to and bonded with a preformed substrate layer or sheet of saran coated nylon.

It is a further object of this invention to provide an efficient and effective method for preparing preformed substrate layers or sheets of saran coated nylon wherein said saran coating is firmly bonded to said nylon.

In accordance with the present invention, film, foil and analogous sheet-like substrates of saran coated nylon are effectively prepared and ultimately laminated with a tightly adhered and firmly anchored sheet-like layer or film of polyethylene or the like non-aromatic hydrocarbon olefin polymer (including, as has been indicated, polypropylene, polybutylene, copolymers of ethylene and propylene, etc.) by a method which comprises the following sequential steps:

(1) preparing a saran coated nylon substrate material by;

(a) subjecting a surface of a nylon film or like article to a high voltage electrical stress accompanied by corona discharge, (b) applying to the preliminarily treated surface of the nylon film a continuous adherent intermediate adhesion promoting layer of an epoxy modified polyester, as further hereinafter defined, (c) thereafter, immediately depositing a saran coating over the intermediate adhesion promoting layer of epoxy modified polyester, said saran coating having a thickness between about 0.02 and 0.5 mil and wherein the saran is a copolymer containing between about 25 and 95 weight percent polymerized vinylidene chloride with the remainder being any other monoethylenically unsaturated monomeric material which is copolymerizable with vinylidene chloride, (2) applying to the saran coated surface of the substrate nylon layer or sheet a continuous adherent coating of an adhesion promoting layer of a polyurethane resin, as further defined herein, (3) depositing a sheet-like layer or film of a non-aromatic hydrocarbon olefin polymer film, as hereinbefore described, and having a thickness of being about 0.5 and 10 mils, over the polyurethane resin layer, and (4) forming a composite, effectively laminated sheet-like or film structure by allowing the intermediate adhesion promoting layer of polyurethane resin to cure under approximately normal room temperatures (i.e. between about 25 and 30° C.) under a pressure as conveniently obtained by firmly winding the composite structure on a film wind-up roll.

In a further embodiment of the present invention it has been found that particularly desirable laminate structures are obtained by first subjecting a surface of the non-aromatic hydrocarbon polyolefin film or like structure, to electrical stress accompanied by corona discharge, followed by the application of such treated surface to the polyurethane resin layer of the saran coated nylon substrate.

Other objects and advantages of the present invention are apparent from the following specification and claims, taken in conjunction with the accompanying drawings.

FIGURE 1 perspectively depicts a composite or laminate film or foil structure in accordance with the invention;

Figure 1:
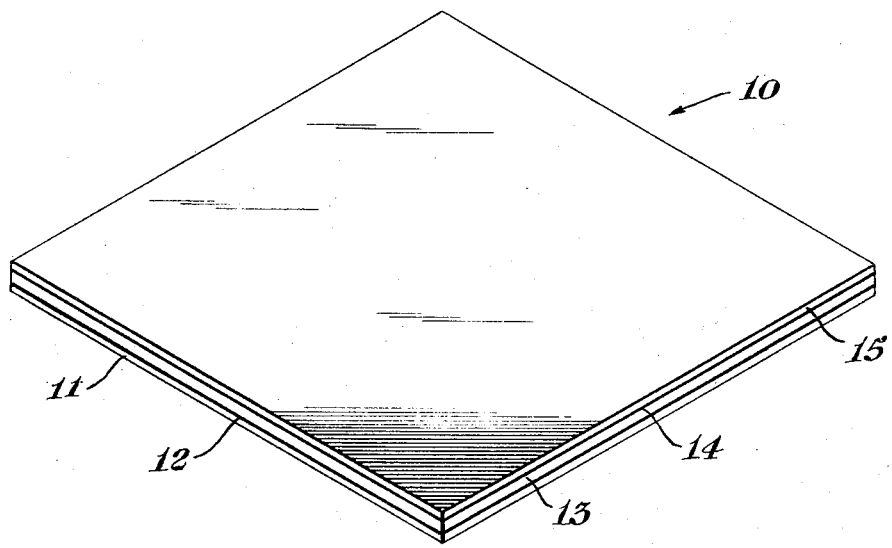
Figure 2:
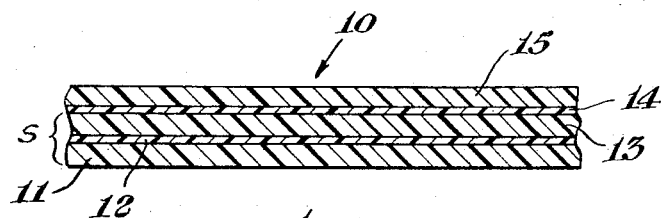
FIGURE 2 illustrates the laminate structure of FIGURE 1 in fragmentary cross section.

With reference to FIGURES 1 and 2, there are illustrated the laminated film or foil products of the present invention, generally designated by the reference numeral 10. The composite film 10 is comprised of a saran coated nylon substrate (designated in FIGURE 2 by the reference character "S") which is composed of a nylon film or like article 11, over which is deposited an intermediate adhesion-promoting coat or layer 12 of an epoxy modified polyester that is applied in a uniform or substantially uniform and relatively thin formation, to and with which there is securely laminated or bonded a coating of saran 13, over which substrate is further deposited an intermediate adhesion-promoting coat or layer 14 of a polyurethane resin, to and with which there is securely laminated or bonded a sheet-like layer or film 15 of a polyolefin polymer.

While the saran coated nylon sheet-like layer "S" is herein generally referred to as the "substrate" or "base" and the polyolefin layer 15 as the applied layer or coating, it is to be understood that such terminology is merely for sake of convenience. It is not to be construed or taken as being limited or absolutely definitive of the presently obtained and provided structures. Thus, the polyolefin layer 14, is just as capable in most instances of being characterized as the "substrate" or "base" and the saran coated nylon sheet-like layer "S" as the applied layer or coating.

The resulting composite or laminated film or foil structures or articles which may advantageously be obtained by practice of the present invention possess, to an unusual degree, practically all the desirable and beneficial attributes and properties of both the saran coated nylon substrate layer and the applied polyolefin layer that are laminated therein. In addition, as indicated, the resulting composite structures are heat sealable in the conventional manner when joined under thermal molding conditions by means of the applied and laminated polyolefin layer. Such composite films or sheet-like products are further possessed of strong and effective bonds between the nylon film and the saran coating, as well as between the laminated saran coated substrate and the polyolefin layer, respectively. In most instances, the joined layers are extremly difficult, if not impossible, to strip apart or delaminate by ordinary physical methods.

The composite film and analogous sheet-like structures of the present invention have particular utility as wrapping and packaging materials for foodstuffs (as in the preparation of gas flush packages for cheese and so forth) and for other articles such as pharmaceuticals, medicinal products, etc., especially in instances when it is desirable to provide packages or the like having maximum resistance to permeation of gases, moisture, greases and the like. The film products are also highly advantageous for wrapping and packaging foodstuffs and other materials which are intended to be handled and maintained and stored at relatively low temperatures in a refrigerated, or frozen condition. Besides providing protection as a strong, tough, flexible covering, they also effectively prevent dehydration of the packaged articles and, where required, tend to avoid development of the condition known as "freezer burn" which frequently occurs in inadequately protected frozen foods.

Although the advantageous composite articles resulting from practice of the present invention are herein predominantly illustrated and described as film, foil and similar sheet-like products that are particularly useful for bags and the like heat-sealable packages, it is readily apparent that in many instances other composite structures and articles may also be prepared and provided such as, and including, tubes, cartons, boxes and other containers, liners therefor, and so forth.

Advantageously, the saran coated nylon substrate, as described herein, is prepared by first treating one surface of a nylon film, or analogous sheet-like material, having a thickness of between about 0.5 and 10 mils, and preferably between about 0.5 and 2 mils, with a high voltage electrical discharge accompanied by corona discharge by any conventionally used method, i.e. by that procedure as essentially described by the British Patent No. 715,914. Such treatment serves to oxidize the surface of such nylon film to the extent that adhesion to the subsequently applied layer or coating of an intermediate, adhesion-promoting epoxy modified polyester resin is effectively enhanced.

The epoxy modified polyester resins which are utilized for providing the intermediate adhesion-promoting coating deposit 12 on the treated nylon film surface, to secure the desired effective lamination between the nylon film 11 and the subsequently applied saran coating 13 are those materials comprising the reaction product of a polyester, based on a variety of polybasic acids, i.e. terephthalic and iso-phthalic acids or mixtures thereof and polyhydroxyl alcohols which contain free carboxyl groups, and/or aliphatic hydroxyl groups, i.e. polyethylene or polypropylene glycols and mixtures thereof and a resinous epoxy compound such as the reaction products of a diphenol or bisphenol and substituted derivatives thereof and epihalohydrins, which epoxy compounds are capable of reacting with the free carboxyl groups and/or the aliphatic hydroxyl groups of the hereindescribed polyesters. As purely exemplary of such resinous epoxy compounds are the diglycidyl ethers of bisphenol A. Other polyepoxides useful for the purposes of the present invention include the diglycidyl ethers of polyglycols, such as polyethylene and polypropylene.

Only a very small quantity of the herein defined epoxy modified polyester resins need be deposited on the treated nylon film to which the saran coating is to be laminated. In general, an amount between about 15 and 150 grams per thousand square feet of substrate surface is suitable to effectively promote the adhesion of the saran coating on the treated nylon film. The coating application of the herein described epoxy modified polyester resin may conveniently be accomplished by spread coating a thin layer of the resin on the treated surface of the nylon film.

It has been found that optimum adhesion of the treated nylon film to the saran coating is achieved by applying the herein defined saran coating to the intermediate adhesion-promoting epoxy modified polyester layer, immediately upon application of such polyester to the treated surface of the nylon film, due to the high rate of cure of such polyester resin even at relatively low temperature, i.e. 25–30° C.

The saran coating utilized for the purposes of the present invention may advantageously be a saran copolymer such as a copolymer of vinylidene chloride and acrylonitrile; a copolymer of vinylidene chloride and vinyl chloride; or a copolymer of vinylidene chloride and acrylic or methacrylic acid or their ester derivatives. It is particularly advantageous for the saran coating to consist of a crystalline saran copolymer containing between about 70 and 95 weight percent of polymerized vinylidene chloride in the copolymer molecule. Other saran copolymers of vinylidene chloride may also be employed, particularly those comprised of at least about 25 weight percent of polymerized vinylidene chloride in the copolymer molecule with any balance being one or more other monoethylenically unsaturated monomers that are copolymerizable with vinylidene chloride.

The coating application of the saran copolymer may be conveniently made by spraying or spread coating a solution or dispersion thereof on the surface of the intermediate adhesion-promoting, epoxy modified polyester layer of the treated nylon film. In this connection it is desirable to employ a relatively fugacious solvent for said saran copolymer to allow rapid drying (with minimized external application of heat) of the applied saran copolymer solution or dispersion. Thus, such solvents as acetone, methyl ethyl ketone, methyl isobutyl ketone, tetrahydrofuran, cyclohexanone, isophorone, dioxane and mesityl oxide, among others, are often beneficially employed.

Advantageously, the saran coated nylon substrate film "S" is a relatively thin film or sheet-like structure. Therefore, highly beneficial results are obtained when the applied saran coating has a thickness of between about 0.02 and 0.5 mil.

The substrate film "S" which is subsequently laminated with the applied polyolefin layer is, therefore, a relatively thin film or sheet-like structure having a thickness between about 0.5 and 10 mils, and preferably between about 0.5 and 2 mils. Likewise, the laminated layer 15 of the polyolefin resin that is bonded to the saran coated nylon substrate by the intermediate polyurethane adhesion-promoting coating 14, as herein described, on the saran surface of the substrate, is a relatively thin deposit generally having a thickness between about 0.5 and 10 mils, and frequently advantageously having a thickness between about 1 and 2 mils.

Therefore, the total thickness of the composite film product may advantageously be between about 0.5 and 20 mils, and frequently between about 1.5 and 4 mils.

The polyurethanes which are utilized for providing the intermediate adhesion-promoting coating deposit 14 on the saran surface of the saran coated nylon substrate in the composite film structures of the invention, to secure the desired effective lamination between the saran coated nylon and polyolefin layers, advantageously contain more than one.

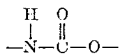

group per molecule and are capable of curing to an infusible, insoluble state by reaction through their reactive isocyanate groups. As an illustration, a particularly desirable polyurethane resin is one obtained by reacting a mixture containing 2 moles of toluene diisocyanate per each mole of a polyalkylene glycol having an average molecular weight of about 400.

Both aliphatic and aromatic diisocyanates can be used to react with polyhydric compounds to produce polyurethane resins which are suitable for purposes of this invention. Illustrative of such diisocyanates are the following: hexamethylene diisocyanate, tolylene diisocyanate, diphenylmethane diisocyanate, 1,5 - naphthylenediisocyanate, p-phenylene diisocyanate, m-phenylene diisocyanate, 4,4'-diisocyanate dibenzyl, naphthylene-1,5-diisocyanate, diphenylmethane - p,p' - diisocyanate, triphenylmethane-p,p' - diisocyanate, tetramethylene - diisocyanate, 4,4'-dicyclohexylmethane-diisocyanate, 1-methyl benzene-2,4,6-triisocyanate, tolylene-2,4-diisocyanate, 1-chloro-phenylene - 2,4 - diisocyanate, xenylene-4,4'-diisocyanate, cyclohexylene-1,2-diisocyanate, cyclohexylene-1,4-diisocyanate, 4,4'-diphenyl diisocyanate, 3,5-tolyl diisocyanate, 2,4-tolylene diisocyanate, 3,3'-dimethyl-4,4'-biphenylene diisocyanate, 3,3'-dimethoxy-4,4'-biphenylene diisocyanate, 4,4'-methylene di-o-toyl diisocyanate.

Generally, liquid polyhydric compounds are used to react with the diisocyanates to produce the polyurethane resins. Of the many polyhydric compounds, the polyalkylene glycols are preferred. Suitable polyalkylene glycols may be represented by the formula $HO(RO)_nH$ in which R stands for an alkylene radical, such as methylene, ethylene, propylene and so forth and $n$ is an integer greater than one. Not all of the alkylene radicals present need to be the same. Polyalkylene glycols containing a mixture of radicals, as in the compound

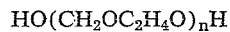

can be used wherein $n$ has a value of at least one.

Particularly preferred polyalkylene glycols are the commercially available products marketed under the name "Carbowax," polyalkylene glycols, such as polyethylene glycol and polypropylene glycol, which have an average molecular weight of from about 300 to about 750.

If desired, mixtures of polypropylene glycols and/or mixtures of polyethylene glycols can be admixed and reacted with the diisocyanates to produce suitable polyurethane resins. Such mixtures are sometimes advantageous in that the properties of the polyurethane resin can be conveniently varied and balanced as desired.

In general, the intermediate adhesion-promoting polyurethanes of the present invention are applied to the saran surfaces of the saran coated nylon substrate in an amount between about 50 and 230 grams per thousand square feet of substrate surface.

Although it can be directly applied if desired, the deposition of the polyurethane is generally preferentially accomplished from a solution or dispersion of the adhesion-promoting agent in a suitable solvent, such as methylethyl ketone, xylene and lower alkyl alcohols among many others. In this connection, it is again generally desirable to employ a relatively fugacious solvent in order to allow rapid drying with minimized external application of heat. Thus, methylethyl ketone or the lower alkyl alcohols, particularly those of less than about 4 carbon atoms are frequently advantageously used.

The polyethylene or other non-aromatic hydrocarbon polyolefin which is employed in the practice of the present invention may be polymers of any normally solid and film-forming nature. For example, the polymers of ethyene which are employed may be those, or similar to those, which sometimes are referred to as "polythenes" and which may be obtained by polymerizing ethylene in a basic aqueous medium and in the presence of polymerization-favoring quantities of oxygen under relatively high pressures in excess of 500 or 1,000 atmospheres at temperatures which may be between 150 and 275° C. Or, if desired, the ethylene and other non-aromatic hydrocarbon olefin polymers may be essentially linear and unbranched polymers or polyolefin products similar to these materials. The essentially linear and unbranched, macromolecular, high density polyethylenes have been referred to as "ultrathenes." They ordinarily have greater apparent molecular weights (as may be determined from such characteristics as their melt viscosities and the like) than the "polythene" type polyethylenes which are usually in excess of at least about 20,000 and generally in excess of about 40,000; densities of about 0.94–0.96 gram per cubic centimeter; and melting points in the neighborhood of 125–135° C. They are also ordinarily found to have a more crystalline nature than conventional polyethylenes and may contain less than 3.0 and even less than 0.3 methyl radicals per 100 methylene groups in the polymer molecule. The essentially linear and unbranched polymers of ethylene and other non-aromatic hydrocarbon olefins may be obtained under relatively low pressures of 1 to 100 atmospheres using such catalysts for polymerizing the ethylene or other olefin as mixtures of strong reducing agents and compounds of Group IV–B, V–B, and VI–B metals of the periodic system; chromium oxide on silicated alumina; hexavalent molybdenum compounds; and charcoal supported nickel-cobalt.

As is apparent, the polyolefin polymers utilized in the practice of the present invention are generally prepared by polymerization of monoolefinic aliphatic olefin monomers such as ethylene, propylene, butylene and so forth (including polymerizable mixtures thereof) that contain from 2 to about 8 carbon atoms, which monomeric olefins are frequently known as being 1-olefins due to their characteristic terminally unsaturated structures.

Figure 3:
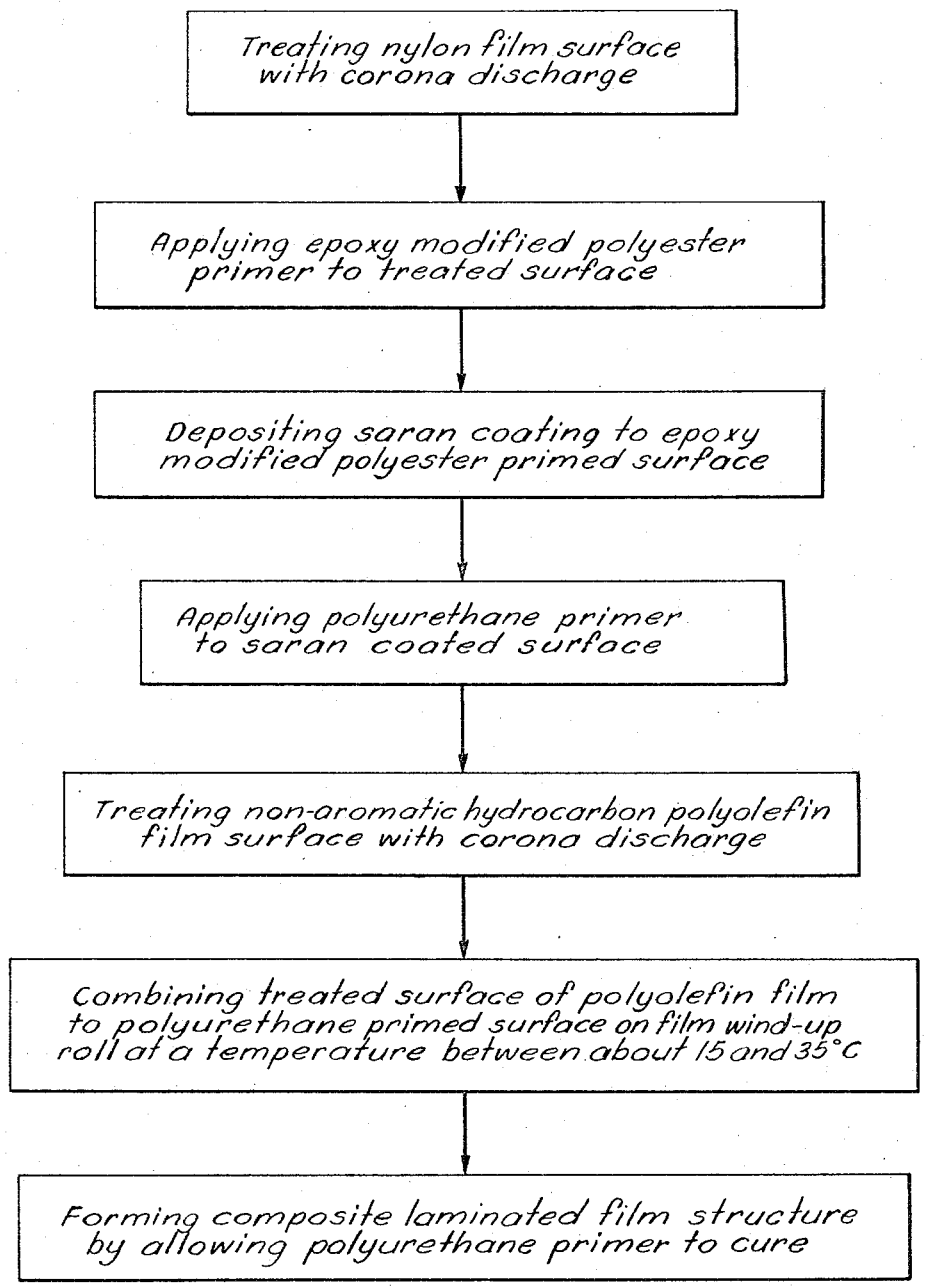
FIGURE 3 depicts a flow sheet illustrating one means of preparing the laminated film products of the invention.

With reference to FIGURE 3 of the drawing, there is illustrated, by means of a flow sheet representation, the series of sequential steps necessary for manufacturing the composite film products of the present invention. In this regard, it is to be understood that such steps and manufacture may be accomplished utilizing any apparatus or technique commonly employed by those skilled in the art.

The following example, wherein all parts and percentages are to be taken by weight, further illustrates the present invention but is not to be construed as limiting its scope.

*Example*

In each of a series of experiments a super-polyamide film (nylon), based on resins derived from E-caprolactum and available commercially as "Capron," having a thickness of about 0.75 mil and having one surface thereof treated with a high voltage electrical stress accompanied by corona discharge, was passed from a supply roll through a conventional two station printer laminator with its treated surface uppermost under a point at which an adhesion promoting epoxy modified polyester resin available commercially as "Shawnad 312" was essentially uniformly applied from the first station of such laminator in amounts sufficient to provide about 40–50 grams of adhesion-promoting polyester resin per thousand square feet of treated nylon film surface. Immediately thereafter, there was separately applied to the polyester layer of the treated nylon film (from the second station of the printer laminator) a 0.1 mil deposit of a 20 percent solution of one of a series of saran copolymers of from 80 to 85 weight percent of vinylidene chloride and 20 to 15 weight percent of acrylonitrile dissolved in a mixture of acetone and methylethyl ketone. Each of the saran coated nylon film substrates was then separately passed through a drying oven operating at a temperature of at least about 250° F. to thoroughly dry the saran coating.

The dried saran coated nylon film substrates were then individually treated on the saran coated surface with an adhesion promotiong solution of polyurethane resin available commercially as "Polybond G–1448" at a rate of about 150 grams of dry polyurethane resin per thousand square feet of substrate surface. The application of the polyurethane resin was made using gravure rolls having a diameter of about 6 inches and a width of about 40 inches for application of the solution to the saran coated surface of the nylon film substrate. After application of the polyurethane, the adhesion-promoting coating thereof was dried on the surface of the substrate in an oven at a temperature of about 150° F. prior to being taken up as a stock or supply roll of the intermediate pre-treated substrate film.

Each of the so-obtained pre-treated substrates was then individually separately laminated with a surface of a 2 mil thick polyethylene film, which polyethylene film surface had been previously treated with a high voltage electrical stress accompanied by corona discharge. The lamination was accomplished by passing said polyurethane coated substrate film and said treated polyethylene film through a pair of combining rolls so that the polyurethane surface of the substrate film was contacted with the treated surface of the polyethylene film. The temperature at contact with the polyurethane coated substrate and treated polyethylene film was about 25–30° C. The resulting laminate was then wound firmly on a conventional windup roll and allowed to remain on such roll for a period of between about 3 and 7 days until the polyurethane adhesion-promoting resin had thoroughly cured.

The polyethylene employed was the conventional, branch-structured variety of polyethylene (of the "polythene" type) having a melt index (according to ASTM D–1238–52T) of about 3.

The resulting composite film structure was tested to determine the cohesive properties of the laminated layers in the film and the heat sealability of the product by means of a heat seal test. This test consisted of measuring the force in pounds that was necessary to separate 1 inch wide strips of the applied polyethylene layers which had been heat sealed together at 300° F. and pulled in a Scott tester in the machine direction. The composite film did not fail in any instance, either as regards the laminated layers or the heat sealed strips, when less than 10 pounds of pull were exerted on any of the sealed specimens tested.

The composite film structure so obtained was further found to be essentially moisture- and grease-proof, and was further characterized by exceptional toughness, resistance to tearing and aging and resistance to embrittlement at temperatures approximating 32° F.

About the same results are obtained when the foregoing procedure is repeated excepting to laminate essentially linear and unbranched polyethylene in the composite film structure being made, or to apply a layer of a copolymer of polypropylene and ethylene (such as one containing about equal weight percentages of each monomer in the polyolefin product) on the treated substrate, or when other saran coated nylon substrates are utilized including those having other specific types of saran coatings thereon, as hereinbefore described, or when other adhesion-promoting polyester and polyurethane resins within the scope indicated in the foregoing specification are employed as described herein.

Slightly less desirable results are obtained by utilization of polyolefin films, as described herein, which had not previously been treated (on the surface adjacent the polyurethane layer of the treated film substrate) with a high voltage electrical stress accompanied by corona discharge.

What is claimed is:
1. A method for preparing a transparent heat sealable essentially moisture and grease-proof composite laminated film structure comprising the sequential steps of:
  (I) Preparing a substrate of a saran coated film by:
    (A) Subjecting a surface of nylon film having a thickness of between about 0.5 and 2 mils to a high voltage electrical stress accompanied by corona discharge,
    (B) Applying to the preliminarily treated surface of said nylon film between about 15 and 150 grams per thousand feet of substrate surface of an essentially continuous coating of an intermediate adhesion-promoting layer of an epoxy modified polyester resin, and
    (C) Thereafter, immediately depositing a saran coating over the intermediate adhesion-promoting layer of epoxy modified polyester, said saran coating having a thickness between about 0.02 and 0.5 mil and wherein the saran is a copolymer containing between about 80 and 85 weight percent of vinylidene chloride and between about 20 and 15 weight percent of acrylonitrile;
  (II) Applying to the saran coated surface of said substrate between about 50 and 230 grams per thousand square feet of substrate surface of an essentially continuous adherent layer of an adhesion-promoting polyurethane resin comprising the reaction product of a diisocyanate and a polyalkylene glycol having a molecular weight of between about 300 and 750 said diisocyanate and said polyalkylene glycol being reacted in such proportion that the NCO/OH ratio is about 2,
  (III) Depositing a non-aromatic hydrocarbon polyolefin film over said adhesion-promoting layer of said polyurethane resin wherein the surface of said non-aromatic hydrocarbon polyolefin film contacting said polyurethane resin has been previously subjected to a high voltage electrical stress accompanied by corona discharge and wherein said non-aromatic polyolefin film has a thickness of between about 0.5 and 10 mils, and
  (IV) Forming a composite laminated film structure by winding the composite structure on a film windup roll and maintaining the structure on said windup roll at a temperature between about 25 and 30° C. until said polyurethane resin is fully cured.
2. The method of claim 1 and including, in addition thereto and in combination therewith, the steps of applying said saran coating over said intermediate adhesion- promoting layer of epoxy modified polyester resin from an applicating solution of asid saran in a volatile solvent vehicle therefore, and, after said application, drying said solvent vehicle from said saran.

3. The method of claim 1 and including, in addition thereto and in combination therewith, the steps of applying said polyurethane resin to the saran coated surface of said substrate from an applicating solvent vehicle therefor and, after said application, drying said solvent vehicle from said saran.

4. A transparent composite film structure which comprises, (1) a substrate layer of saran coated nylon film having a thickness between about 0.5 and 2.5 mils including said saran coating of between about 0.02 and 0.5 mil, said saran being a copolymer containing between about 80 and 85 weight percent of vinylidene chloride and between about 20 and 15 weight percent of acrylonitrile, and said saran being firmly bonded to said nylon with an intermediate adhesion-promoting layer of an epoxy modified polyester resin, said substrate layer being uniformly coated on its saran coated surface with; (2) an intermediate adhesion-promoting layer of a polyurethane resin comprising the reaction product of a diisocyanate and a polyalkylene glycol having a molecular weight of between about 300 and 750, said diisocyanate and said polyalkylene glycol being reacted in such proportion that the NCO/OH ratio is about 2; and (3) a tightly adhered superficial layer over the applied layer of said polyurethane resin of a non-aromatic aliphatic hydrocarbon polymer film having a thickness between about 0.5 and 10 mils.

5. The composite film structure of claim 4 wherein the non-exposed surfaces of said nylon film and said non-aromatic aliphatic hydrocarbon polymer film have been treated with a high voltage electrical stress accompanied by corona discharge.

6. The composite film structure of claim 4 wherein said epoxy modified polyester is present in amount of between about 15 and 150 grams per thousand square feet of substrate surface.

7. The composite film structure of claim 4 wherein said polyurethane resin is present in amount between about 50 and 230 grams per thousand square feet of substrate surface.

References Cited by the Examiner
UNITED STATES PATENTS

| | | | |
|---|---|---|---|
| 2,715,076 | 8/1955 | Molinski | 161—231 X |
| 2,764,502 | 9/1956 | Emerson | 117—47 |
| 2,825,672 | 3/1958 | Koblitz et al. | 161—184 X |
| 2,879,547 | 3/1959 | Morris | 161—252 X |
| 3,005,728 | 10/1961 | Bridgeford | 117—118 |
| 3,017,302 | 1/1962 | Hultrans | 161—227 X |
| 3,023,126 | 2/1962 | Underwood et al. | 161—190 X |
| 3,037,868 | 8/1962 | Rosser | 161—250 |
| 3,198,692 | 8/1965 | Bridgeford | 156—331 X |

EARL M. BERGERT, *Primary Examiner.*

CLIFTON B. COSBY, *Examiner.*